No. 743,753. PATENTED NOV. 10, 1903.
W. RICHTER.
MEAT CHOPPING MACHINE.
APPLICATION FILED APR. 4, 1903.
NO MODEL. 2 SHEETS—SHEET 1.

Witnesses,

Inventor,
Walther Richter,
By _____
Attorneys.

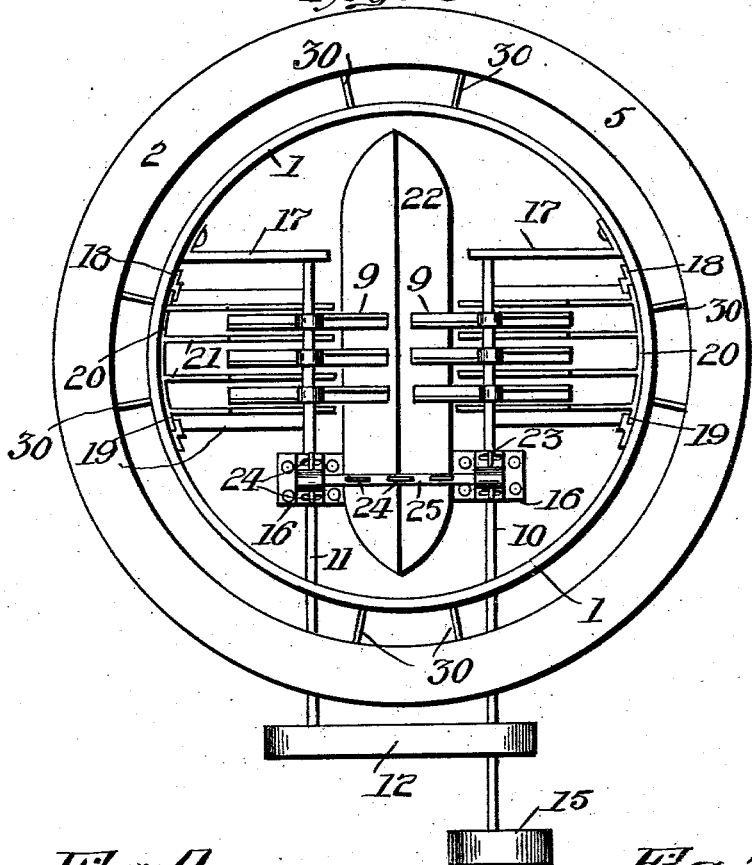
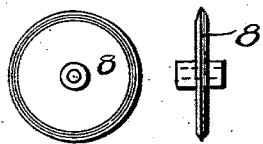
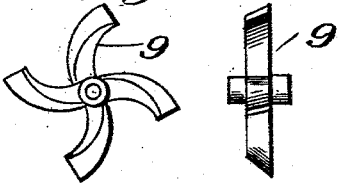

No. 743,753. Patented November 10, 1903.

UNITED STATES PATENT OFFICE.

WALTHER RICHTER, OF ALLEGHENY, PENNSYLVANIA.

MEAT-CHOPPING MACHINE.

SPECIFICATION forming part of Letters Patent No. 743,753, dated November 10, 1903.

Application filed April 4, 1903. Serial No. 151,064. (No model.)

*To all whom it may concern:*

Be it known that I, WALTHER RICHTER, a citizen of the United States of America, residing at Allegheny, in the county of Allegheny and State of Pennsylvania, have invented certain new and useful Improvements in Meat-Chopping Machines, of which the following is a specification, reference being had therein to the accompanying drawings.

This invention relates to certain new and useful improvements in meat-chopping machines; and my invention relates to that class of meat choppers or cutters in which a series of knives are radially fixed upon a rotatable shaft and are mounted to revolve between a series of stationary knives fixed at one side of the knife-shaft. Means is provided for retaining the meat in position where it will be effectually engaged by the knives and also for agitating or stirring the meat, together with means for cooling the pan or other receptacle containing the meat and in providing means whereby access may be had to the pan for readily cleansing the same.

In describing the invention in detail reference is had to the accompanying drawings, forming a part of this specification, and wherein like numerals of reference indicate like parts throughout the several views, in which—

Figure 1:
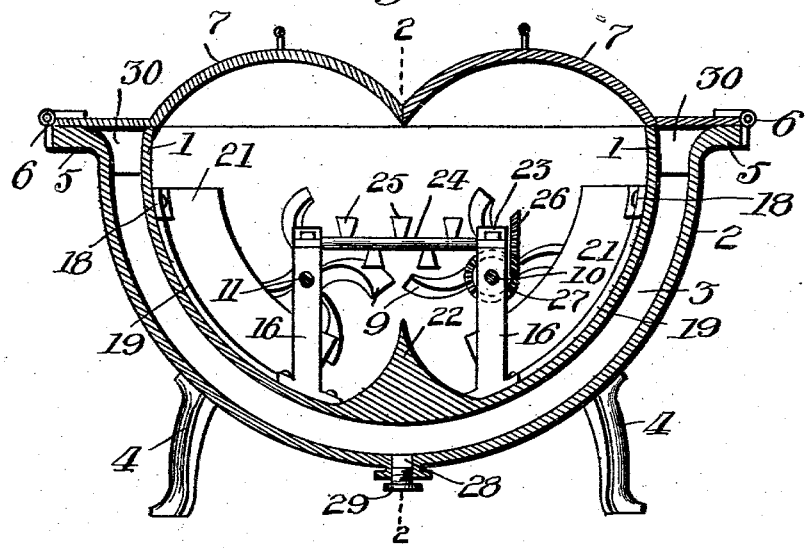
Figure 2:
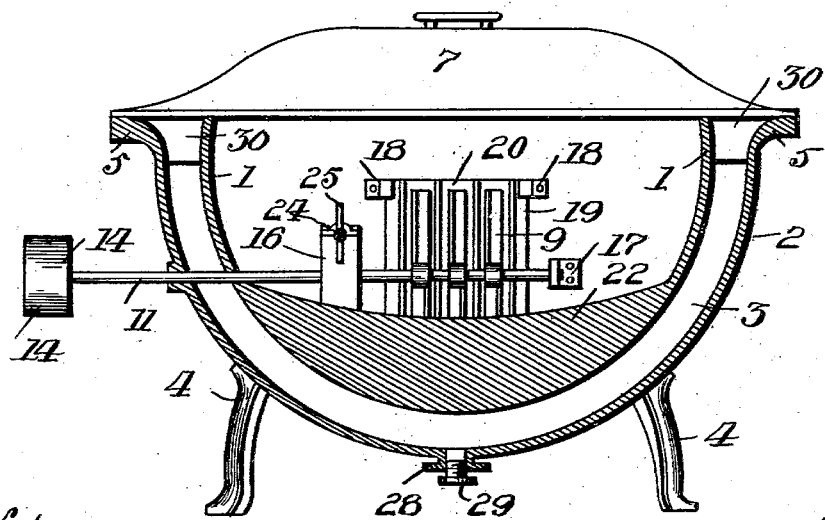

Figure 1 is a cross-sectional view of my improved machine. Fig. 2 is a transverse sectional view taken on the line 2 2 of Fig. 1. Fig. 3 is a top plan view with the covers removed. Fig. 4 is a detail side and edge view of the form of cutter. Fig. 5 is a like view of another or modified form of cutter.

To put my invention into practice, I provide a suitable pan or receptacle embodying an inner pan 1 and an outer pan 2, these two pans or vessels being spaced a distance apart to provide a suitable space 3, in which may be placed water, ice, or other cooling agent in order to maintain the meat at the desired temperature. The supporting-legs 4 are suitably attached to the outer pan or shell, and this outer pan or shell at its upper edge is preferably flanged outwardly, as at 5, and has secured thereto by hinges 6 the lids or covers 7, each of which covers one-half of the pan or vessel and which will match neatly together when both are closed, as shown in Fig. 1. The meat to be chopped is adapted to be placed within the pan or bowl and is engaged by a plurality of cutters radially arranged on shafts extending through the wall of the pan or bowl. These rotary or revolving cutters may be of a circular or disk-like form, as seen at 8 in Fig. 4, or composed of a plurality of cutting-blades 9, radially mounted on the shafts, as seen in the other views of the drawings. Two sets of these cutters are employed, one set being mounted on a drive-shaft 10 and the other set on a shaft 11, which is driven through the medium of a belt 12, passing over a pulley 14 on the shaft 11 and over a pulley provided therefor on shaft 10, the drive-shaft 10 also having a driven pulley 15 to receive driving-belt. (Not shown.) These two shafts extend through the wall of the pan or bowl at one side thereof and are journaled in standards 16 and in brackets or arms 17, secured to the inner face of the inner pan 1. Arranged on the inner face of said pan 1 are angle-cleats 18, which form guides to receive the flanges 19, carried by the plate 20, which carries the stationary knives or cutters 21 and plate 20. The knives 21 are shaped to conform to the arc of the inner face of the pan 1. The pan 1 is provided centrally of its bottom with an enlargement 22, the side walls of which are concave, whereby to give sufficient clearance for the rotary cutters, these enlargements being provided for the purpose of holding the meat up into proximity to the knives 21, whereby to be effectually engaged by the rotary cutters. On the upper end of the standard 16 are suitable bearings 23, in which is journaled a beater-shaft 24, having a series of blades or beaters 25 thereon. This beater or stirrer serves to agitate and chop the meat and keep the same effectually stirred during the process of chopping. This beater or stirrer is driven through the medium of the skew-gear 26, mounted on one end of a shaft, which engages with the skew-gear 27, carried on the driven shaft 10. The meat may be placed in position by uncovering only one-half of the pan or receptacle, if so desired, or both of the covers may be thrown back.

It will be observed that access may be had to inspect the meat during the process of cutting by only uncovering one-half of the pan or receptacle.

The water may be drained off from the refrigerating-space 3 through a port 28 in the bottom of the outer shell 2, which is closed by a suitable plug 29. The inner pan is supported from the outer pan or shell by means of suitable braces 30.

It will be apparent that an equivalent gearing can be substituted for the skew-gearing comprising the gears 26 and 27 without departing from the spirit of the invention.

While I have shown a practical form of my invention, yet it will be noted that various slight changes may be made in the details of construction without departing from the general spirit of my invention.

Having fully described my invention, what I claim as new, and desire to secure by Letters Patent, is—

1. In a meat-chopper, the combination with a double-walled pan or vessel having an airspace between its walls adapted to receive a refrigerating agent, of a pair of shafts extending through one side wall of said pan, brackets secured to the inner pan and supporting the inner ends of said shafts, a plurality of rotary cutters mounted on said shafts, stationary knives carried by the inner pan and between which said rotary cutters revolve, and an agitator driven from one of said shafts, substantially as described.

2. In combination with a pan provided with a centrally-disposed enlargement, stationary cutters secured to the sides of the pan opposite the said enlargement, two parallel shafts rotatably mounted in said pan and being provided with blades coöperating with the first-named blades, a beater-shaft disposed over said enlargement and at right angles to said first-named shafts, means for operating the first-named shafts, and means whereby the said last-named shaft is rotated simultaneously with the first-named shafts.

In testimony whereof I affix my signature in the presence of two witnesses.

WALTHER RICHTER.

Witnesses:
H. C. EVERT,
E. E. POTTER.